No. 691,541. Patented Jan. 21, 1902.
C. GLOVER.
COASTER BRAKE.
(Application filed June 11, 1901.)
(No Model.)
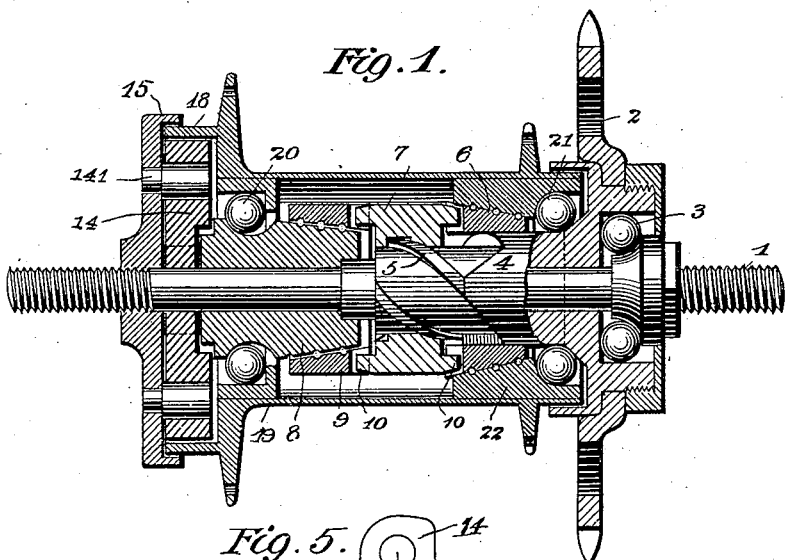
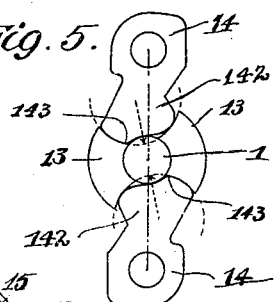
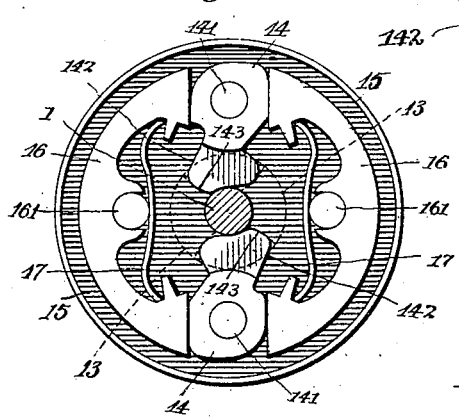
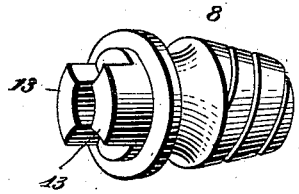
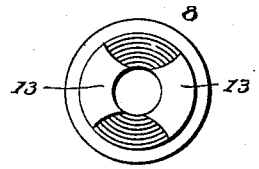
WITNESSES:
INVENTOR:
Charles Glover,
BY
ATTORNEY

UNITED STATES PATENT OFFICE.

CHARLES GLOVER, OF NEW BRITAIN, CONNECTICUT, ASSIGNOR TO P. & F. CORBIN, A CORPORATION OF CONNECTICUT.

COASTER-BRAKE.

SPECIFICATION forming part of Letters Patent No. 691,541, dated January 21, 1902.

Application filed June 11, 1901. Serial No. 64,097. (No model.)

*To all whom it may concern:*

Be it known that I, CHARLES GLOVER, a citizen of the United States, residing at New Britain, Hartford county, Connecticut, have invented certain new and useful Improvements in Coaster-Brakes, of which the following is a full, clear, and exact description.

My invention relates to brake mechanism for coaster-brakes and like devices.

The function of a coaster-brake as used upon bicycles and other vehicles is to permit the rider to cease pedaling whenever he so desires, allowing the machine to coast along freely under its own momentum. Its construction is such that the user may at any time by reversing the direction of the pedal-cranks, or, as it is called, "back-pedaling," throw in brake mechanism which will coact with some part of the moving mechanism in such manner as to check the advance of the machine or slow it down to any desired speed.

My invention as claimed herein consists mainly in the improvement of the brake mechanism by which I secure a parallel movement of the brake-shoes, the effect of which movement is to throw the shoes into firm and equitable engagement with the moving part to be checked or slowed down, preserving even contact and distributing wear so uniformly that the efficient life of the shoes is prolonged.

The objects I have sought to attain are simplicity, durability, effectiveness, strength of construction, ease and certainty of action, and quickness, smoothness, and evenness of operation under all conditions. All of these objects I attain by the employment of the mechanism hereinafter described, and shown in its preferred form in the accompanying drawings, in which—

Figure 1 is in the main a sectional view of a coaster-brake for use upon bicycles and the like. Fig. 2 is a vertical projection of the brake proper, the wheel-hub and the shifting mechanism being removed to facilitate illustration. Fig. 3 is a perspective view of a detail. Fig. 4 is an end elevation of the detail shown in Fig. 3. Fig. 5 is a diagrammatic view of details of construction for the purpose of illustrating their action.

The following detailed description relates particularly to the preferred form of my invention, which, it is obvious, is susceptible of modification without departing from the spirit or scope of my invention.

1 is a main shaft or axle.

2 is a gear or sprocket wheel, which will be termed herein the "driver."

3 represents antifriction-bearings for the driver mechanism.

4 is a hub projecting from the driver. 5 is a worm on the inner end of said hub 4.

6 is a clutch-ring.

7 is a sleeve mounted on the worm 5.

8 is a cone loosely mounted on the axle 1, which cone will be termed the "brake-actuator."

9 is a clutch-ring adapted to coact with the brake-actuator 8.

10 10 are projections from the sleeve 7, adapted to take into suitable recesses in the clutch-rings 6 and 9, whereby the parts 6, 7, and 9 are prevented from turning independently of one another.

13 13 are projections from the end of the brake-actuator 8.

14 14 are cams pivotally mounted at 141. 142 are arms projecting from said cams 14, which arms may be engaged by projections 13 13 on the brake-actuator 8. 15 is a stationary bracket carrying pivots 141 for said cams.

16 16 are brake-shoes. These brake-shoes 16 are preferably substantially inflexible.

17 17 are springs by which the brake-shoes may be retracted or held out of operative engagement with the moving parts which said shoes are designed to check.

161 represents guide-pins carried by the bracket 15, the function of said pins being partly to guide the brake-shoes as they are moved in or out to take the strain imparted to the brake-shoes when the same are performing the braking function. The cams 14 14 are preferably double-acting, in that each will act upon both of the shoes 16 16 in such manner as to impart parallel movement thereto, consequently bringing the entire braking-surface into firm and equitable engagement with the moving part, the speed of which is to be slowed down or checked thereby.

19 is a wheel-hub. 18 is a flange carried thereby and overstanding the brake-shoes 16 16.

20 21 are suitable antifriction-bearings for the hub 19.

22 is a fixed socket within the hub 19, the inner surface of which is adapted to be engaged or disengaged.

I have thus far described generally the construction shown in the drawings, which is illustrative of a form of hub coaster mechanism invented by me and made the subject-matter of another application filed of even date herewith, Serial No. 64,098. The brake mechanism particularly described herein being broadly new and useful, it should be understood that it is not confined to use with clutch mechanism such as particularly shown and described herein.

In operation the construction of the clutches is such that by rotating the driver 2 ahead the same will be coupled with the hub 19 through sleeve 7, ring 6, and socket 22, so that a corresponding movement will be imparted to said hub. When the rider desires to rest, he may cease pedaling, whereupon the speed of the driver 2 slows down or stops. Inasmuch as the clutch-ring 6 is engaged with the hub 19, the continued rotation of the latter will cause the clutch-ring 6 to rotate at a speed in excess of the speed of the driver 2. Consequently the sleeve 7, which is engaged with the clutch-ring 6 by the projections 10, will be rotated at a corresponding speed in excess of the driver 2. This difference in the speed of rotation of the driver 2 and the sleeve 7 will cause the latter to ride down the worm 5 and move to the left, thus freeing it from the clutch-ring 6, which in turn then becomes freed from the socket 22, whereupon the hub is disconnected and free to rotate, so that the machine is permitted to coast along under its own momentum. A reverse movement of the driver 2 shifts the sleeve 7 to the left, causing the clutch 9 to be engaged with the brake-actuator 8. A continued rearward movement of the driver 2 rotates the brake-actuator 8, causing the arms 13 13 to swing the cams 14 14, which in turn throw the brake-shoes 16 16 outwardly into engagement with the flange 18 of the hub 19, thus permitting the rider to slow down or check the speed of rotation of the hub. As soon as the backward pressure on the driver 2 is released the brake-actuator is returned to its normal position either by rotating the driver 2 ahead, which gives a corresponding movement to the brake-actuator, or by the springs 17 17, the tendency of which is to retract the brake-shoes 16 and cause the cams 14 to assume their normal position, which latter, bearing against the projections 13 13 of the brake-actuator, throw the latter back to its normal position. It is preferred to provide shoulders 143 upon the arms 142 of the cams, which shoulders act as stops to limit the backward swing of the cam-arms 142 by taking up against the axle 1, as shown in Fig. 2.

In Fig. 5 I have shown a diagrammatic view of the cams, the cam-actuator, and the axle. The operative faces of the projections 13 on the cam-actuator are preferably formed in the arc of a circle, said arc cutting slightly into the path of the axle 1. The ends of the cam-arms 142 are shaped to conform substantially to the curve of the operative faces of the projections 13, as shown. The center upon which the curve of the end of the cam-arm is formed is "off center." Consequently the cam-arm is provided with a long side and a short side. In the end face of the cam-arm a recess is formed to allow the cam-arm to partially clear the axle 1, as shown in Fig. 5, in which the short side of the cam-arm bears against one of the projections 13, while the other projection 13 bears against the long side of said cam-arm. In this position the axle serves as a stop to check the cam and the cam-surface as a stop to check the projection 13. The construction, however, is such that when the parts are in this position the short side of the cam-arm bears directly against the projection 13 and is all ready to be moved the instant it is desired to apply the brake. In this way lost motion is practically avoided and the quick and efficient operation of the brake is made certain. The advantage of the double-acting cam is that it imparts twice as much movement to the brake as a single-acting cam. Consequently but a slight rearward movement of the pedals is required to apply the brake.

The absence of the necessity of having the brake-shoes formed of spring metal permits said brake-shoes to be made of wrought or cast metal of any kind. This allows of the use of any suitable metal, hard or soft, to be used in the formation of the brake-shoes. Ordinarily brakes of this type are provided with a split ring, the spring in which is relied upon to contract the same and withdraw it from engagement with that part of the mechanism which it is designed to frictionally brake. By my invention the brake-shoes are relieved of this duty, and consequently need not be made of spring metal.

What I claim is—

1. A brake mechanism for coaster-brakes and the like, said mechanism comprising a plurality of non-yielding brake-shoes and a brake-actuating device and means between the ends of said shoes and said brake-actuating device to impart to said shoes an outward movement, and means to couple said brake-actuating device with the motive power therefor.

2. A brake mechanism for coaster-brakes and the like comprising a wheel-hub, a plurality of non-yielding brake-shoes, a portion of the hub overstanding said shoes, a brake-actuating device and means between the ends of the shoes and said brake-actuating device to impart to said shoes an outward and parallel movement, and means to couple said brake-actuating device with the motive power therefor.

3. A brake mechanism for coaster-brakes, comprising, a wheel-hub, an axle, a brake-shoe, a brake-actuator, means of connection between said brake-actuator and said brake-shoe whereby the movement of the former may be transmitted to the latter, said means of connection also acting as a stop to check the rearward movement of said actuator.

4. A brake mechanism for coaster-brakes and the like comprising a plurality of brake-shoes, and means to operate each of said shoes by pressing against each end thereof, said means coacting with the driving mechanism and a clutch therefor.

5. A brake mechanism comprising a plurality of independent brake-shoes, a plurality of cams, each adapted to operate upon the adjacent ends of two brake-shoes whereby said brake-shoes may be moved bodily outward, and means to operate said cams.

6. A brake mechanism comprising a plurality of independent brake-shoes, a plurality of double-acting cams, each adapted to operate upon the adjacent ends of two brake-shoes whereby said brake-shoes may be moved bodily outward, and means to operate said cams.

7. A brake mechanism comprising a plurality of independent brake-shoes, means for guiding said brake-shoes, double-acting cams, each adapted to operate upon the adjacent ends of a plurality of brake-shoes whereby said brake-shoes may be moved bodily outward, and means to operate said cams.

8. A brake mechanism comprising a plurality of brake-shoes, pins for guiding and resisting the turning moment of said brake-shoes, double-acting cams, each adapted to operate upon the adjacent ends of two brake-shoes whereby said brake-shoes may be moved bodily outward, and means to operate said cams.

9. A brake mechanism comprising a plurality of brake-shoes, springs for holding said brake-shoes in their non-operative positions, double-acting cams, each adapted to operate upon the adjacent ends of the brake-shoes whereby said brake-shoes may be moved bodily outward, and means to operate said cams.

10. In a coaster-brake, a shaft, a pair of brake-shoes, a cam between the adjacent ends of said brake-shoes, a shouldered extension on said cam, said shaft acting as a stop therefor, and means to operate said cam.

11. A brake mechanism for coaster-brakes comprising, a wheel-hub, an axle, a brake-shoe, a cam, an arm projecting from said cam said arm having a long side and a short side, a brake-actuator comprising a sleeve with a recess in the side thereof adapted to receive the end of said brake-arm, and a recess in the end of said brake-arm to allow the same to partially clear the axle.

12. A brake mechanism for coaster-brakes and the like, comprising a wheel-hub, an axle, a brake-shoe and means for controlling said brake-shoe, said means having a lever-arm projecting therefrom, said lever-arm having a long side and short side, the said axle being located in the path of movement of the long side of the said arm to act as a check therefor and means for moving said lever-arm to operate said brake-shoe.

Signed at New Britain, Connecticut, this 5th day of June, 1901.

CHARLES GLOVER.

Witnesses:
M. C. NORTH,
WILLIAM J. SURRE.